J. F. WOLVIN.
CHIP BREAKER.
APPLICATION FILED MAY 31, 1910.

984,408.

Patented Feb. 14, 1911.

Witnesses
A. M. Dorr.
C. M. Shannon

Inventor
John F. Wolvin
By [signature]
Attorneys

UNITED STATES PATENT OFFICE.

JOHN F. WOLVIN, OF ST. CLAIR, MICHIGAN.

CHIP-BREAKER.

984,408.  Specification of Letters Patent.   Patented Feb. 14, 1911.

Application filed May 31, 1910. Serial No. 564,232.

*To all whom it may concern:*

Be it known that I, JOHN F. WOLVIN, a citizen of the United States of America, residing at St. Clair, in the county of St. Clair and State of Michigan, have invented certain new and useful Improvements in Chip-Breakers, of which the following is a specification, reference being had therein to the accompanying drawings.

In operating edging cutters, panel raisers and like wood working machines the knives as they leave the work, are liable to splinter or split the edges of the wood if the latter be unsupported. This is particularly true where the cutters revolve in a horizontal plane and operate on both sides of the blank simultaneously, so that the platen, table or bed on which the work rests, does not support the latter against the thrust of the cutters as in the vertical type of machine.

This invention relates to chip breakers for wood working machinery for forming a sharp, clean edge on the work when the cutter leaves it.

The invention consists in the matters hereinafter set forth, and more particularly pointed out in the appended claims.

Figure 1:
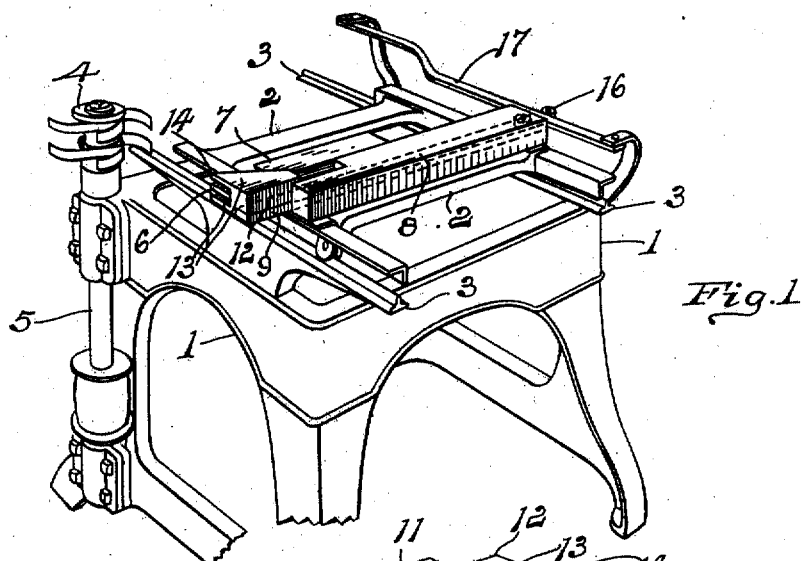
Figure 2:
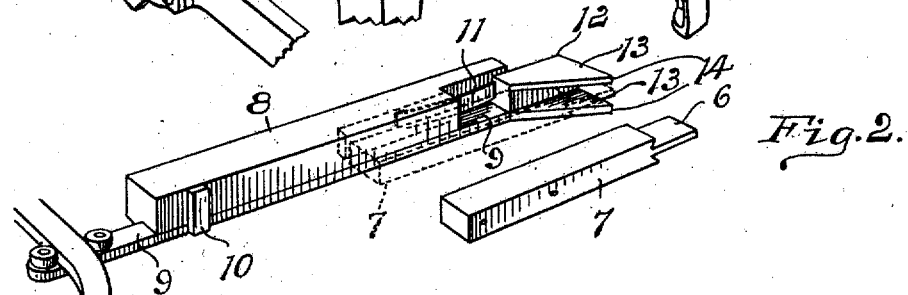
Figure 3:
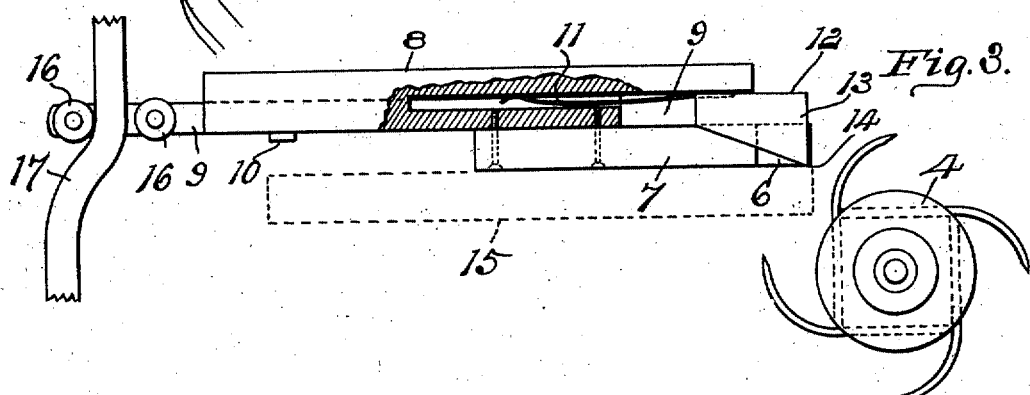

Referring to the drawings, Figure 1 is a view in perspective, partially broken away, of a wood working machine provided with a chip breaker that embodies features of the invention; Fig. 2 is a view in detail of the breaker, showing method of applying pattern blank thereto; and Fig. 3 is a plan view in detail, partly broken away and in section, of the breaker, with a cutter in operating relation thereto.

As shown in the drawings 1 indicates the frame of a wood working machine on which a table 2 may be reciprocated on guides 3 to carry work past a rotary cutter 4 mounted on a suitable power driven spindle 5, the latter being adapted to form the edge of work forced by it, as, for example, to make a tenon tongue thereon as indicated at 6 in a pattern blank 7.

A guide bar 8 is secured transversely across the bed to take the place of the usual gage or angle plate. A strip 9 is longitudinally reciprocable in a gain or rabbet in the face of the bar 8 adjacent the cutter 4. A stop 10 on the outer end of the bar 8 retains the outer portion of the strip while its inner end bears against a spring-finger 11 or the like which holds it yieldingly projecting slightly from the bar. A head 12 is secured on the strip adjacent the cutter side of the machine, the bar 8 being notched or cut away to receive the head when the strip is fully retracted. Wing plates 13 are formed on or secured to the head to embrace loosely and project past a wooden pattern blank 7 secured to the forward side of the bar 8. The outer corners 14 of the wings are adapted to bear against the inner margin of a blank to be operated on, which is placed against the pattern blank 7 as indicated by the dotted lines 15. The inner end of the strip 9 has friction rolls 16 engaged by a cam track 17 secured to the frame 1 of the machine in any suitable manner.

In operation, a pattern blank is secured in proper position on the front of the bar 8 and pieces to be operated on are thereafter placed against it and forced past the cutter by sliding the table past the spindle. The parts are so disposed that as the extremities of the cutters first break out of a piece, they just clear the wing corners of the chip breaker, which yieldingly bears against the wood so as to prevent its splitting or splintering. As the cutter advances, and its knives accordingly cut deeper and deeper into the work, the cam track retracts the wings so that their corners keep clear of the cutter but support the wood adjacent the knife points and keep it from breaking. This leaves a clean cut instead of the usual ragged edge which has to be finished off ordinarily by a second operation.

As herein indicated the head is adapted for the particular form of cutter shown in the drawings, but if the working edge of the cutter be of different shape, the bearing edge of the head is accordingly varied so that it bears against and supports the work at substantially the line of cleavage where the cutting edge comes through the rear face of the work.

Obviously, changes in the details of construction may be made without departing from the spirit of the invention and I do not care to limit myself to any particular form or arrangement of parts.

What I claim as my invention is:—

1. In a wood working machine, the combination of a feed table and a rotary cutter adapted to operate on work carried to it by the table, of a member secured on the table transverse to its path of motion, and means reciprocable in the member adapted to yieldingly support the face of the work at substantially the point where the knife edges of the cutter pass out of it.

2. In a wood working machine, the combination of a feed table and a rotary cutter adapted to operate on work carried to it by the table, of a member secured on the table transverse to its path of motion, means reciprocable in the member adapted to yieldingly support the face of the work at substantially the point where the knife edges of the cutter pass out of it, and means for shifting the supporting means to clear the advancing edges of the cutter.

3. In a wood working machine the combination of a feed table and a rotary cutter adapted to operate on work carried to it by the table, of a member secured on the table transverse to its path of motion, a head reciprocable in the member having limited yielding lateral movement therein for yieldingly supporting the face of the work at substantially the point where the knife edges of the cutter pass out of it, and means for shifting the head to clear the advancing edges of the cutter.

4. In a wood working machine, the combination of a feed table and a rotary cutter adapted to operate on work carried to it by the table, of a bar secured on the table transverse to its path of motion, a head longitudinally reciprocable on the face of the bar adjacent the cutter, and a cam track member adapted to shift the head to clear the cutter edge as it passes it.

5. In a wood working machine, the combination of a feed table and a rotary cutter adapted to operate on work carried to it by the table, of a bar secured on the table transverse to its path of motion, a head longitudinally reciprocable on the face of the bar adjacent the cutter, a spring member yieldingly projecting the head from the face of the bar, and a cam track member adapted to shift the head to clear the cutter edge as it passes it.

6. In a wood working machine, the combination of a feed table, and a rotary cutter adapted to operate on work carried to it by the table, of a bar secured on the table transverse to its path of motion, a strip longitudinally reciprocable in the bar, a head on the strip adjacent the cutter, a cam track member secured to the machine adjacent the table and engaged by the strip to move the latter longitudinally, and a spring yieldingly projecting the head from the face of the bar.

7. In a wood working machine, the combination of a main frame, a rotary cutter thereon and a feed table adapted to be moved past the cutter, of a cam track member secured to the main frame adjacent the table, a bar secured on the table transverse to its path of motion, a strip reciprocable in a longitudinal recess of the bar, a head on the strip adjacent the cutter, a spring yieldingly projecting the head and strip from the face of the bar, and means on the strip engaging the cam track member for shifting the head to clear the edges of the cutter as it passes the latter.

In testimony whereof I affix my signature in presence of two witnesses.

JOHN F. WOLVIN.

Witnesses:
ANNA M. DORR,
ANNA M. SHANNON.